UNITED STATES PATENT OFFICE.

CARL MÜLLER, OF LUDWIGSHAFEN-ON-THE-RHINE, AND MAX HENRY ISLER, OF MANNHEIM, GERMANY, ASSIGNORS TO BADISCHE ANILIN & SODA FABRIK, OF LUDWIGSHAFEN-ON-THE-RHINE, GERMANY, A CORPORATION.

ANTHRAQUINONE DYES.

1,062,988.  Specification of Letters Patent.  Patented May 27, 1913.

No Drawing.  Application filed April 20, 1912.  Serial No. 692,133.

*To all whom it may concern:*

Be it known that we, CARL MÜLLER and MAX HENRY ISLER, respectively a subject of the King of Bavaria and a citizen of the Swiss Republic, residing, respectively, at Ludwigshafen - on - the - Rhine and Mannheim, Germany, have invented new and useful Improvements in Anthraquinone Dyes, of which the following is a specification.

Our invention consists in the manufacture and production of a new class of compounds of the anthraquinone series, these being amidins containing two 2-amino-anthraquinone residues. They possess generally a constitution corresponding to the formula

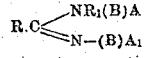

in which R and $R_1$ may each be equal to hydrogen, alkyl, or aryl, including anthraquinonyl, and A and $A_1$ are either similar or different anthraquinonyl residues. They represent valuable coloring matters. The new amidins containing two 2-amino-anthraquinone residues can be obtained by converting 2-amino-anthraquinone bodies into their amidins by the application of processes known in connection with the production of amidins of other series, such for instance as those referred to in Bernthsen's "*Organische Chemie*", 10th edition, page 199. For instance, beta - amino - anthra - quinone bodies can be combined with suitable acid derivatives of carboxylic acids, or of ortho-carboxylic acids, such for instance as ortho-carboxylic acid esters, amido-ethers, amid-chlorids, chlorids, and the like. New amidins, according to the present invention, can also be obtained by treating 2-amino-anthraquinones with carbon tetrachlorid and naphthalene, or diphenyl, or other hydrocarbon which is capable of condensing with carbon tetrachlorid while splitting off halogen hydrid.

Our new compounds are characterized by yielding from yellow to red solutions in concentrated sulfuric acid, from yellow to red vats in alkaline hydrosulfite solution, and they dye cotton from vats yellow to orange-yellow shades.

The following are examples of how our invention can be carried into practical effect, but the invention is not confined to these examples. The parts are by weight:

Example 1: Melt together 10 parts of 2-amino-anthraquinone, 50 parts of naphthalene and 0.5 part of finely divided copper. Stir the mixture and heat it in a vessel provided with an inverted condenser at about from 100° to 120° C. When the melt is uniform and well mixed, add 10 parts of carbon tetrachlorid through the condenser. Raise the temperature gradually to from 140° to 150° C., whereupon the reaction takes place, a considerable amount of hydrochloric acid being evolved. Continue stirring the mass at this temperature until an increase in the formation of coloring matter is no longer observable and then allow the temperature of the mass to fall to about 100° C. and dilute with 50 parts of toluene. Filter, when the temperature of the mass has sunk to from 50° to 60° C., and wash with toluene to remove the excess of naphthalene, and then wash with alcohol and dry the condensation product. It can be re-crystallized from ortho-dichlor-benzene and its melting point is approximately from 298° to 302° C. It is insoluble in water, dilute acids and alkalis. It dissolves in concentrated sulfuric acid, the solution being yellow-red. It very readily yields a vat upon treatment with alkaline hydrosulfite solution, such vat dyeing wool and cotton clear yellow shades.

Example 2: Heat together, for a few hours, in a vessel provided with an inverted condenser, 10 parts of 2-amino-anthraquinone, 25 parts of diphenyl, 10 parts of carbon tetrachlorid, and 0.5 part of finely divided copper, keeping the temperature between 140° and 160° C. Dilute the melt with toluene, collect the condensation product, wash first with toluene and then with alcohol. The new condensation product can be obtained in a pure state by recrystallization from, for instance, glacial acetic acid, in which it is readily soluble. From the alkaline hydrosulfite vat it yields yellow dyeings on cotton and wool.

The products of both of the foregoing examples can, if desired, be sulfonated. The sulfoacids will dye wool yellow shades.

Example 3: Dissolve 1 part of orthoformic-acid-ethylester $HC(OC_2H_5)_3$, in 5 parts of nitrobenzene and add, gradually, 1 part of 2-amino-anthraquinone, while stirring, at from 130° to 140° C. Continue stirring for from 3 to 5 hours at this temperature and then precipitate the intermediate product by ligroin. The said product is insoluble in dilute acids and alkalis, yields a yellow solution in concentrated sulfuric acid and is soluble in alkaline hydrosulfite, but does not dye cotton from such solution. On heating this intermediate product with 2-amino-anthraquinone, in the presence of an indifferent solvent of high boiling point, a vat coloring matter is obtained which according to analysis and molecular weight determination, possesses a constitution corresponding to the formula:

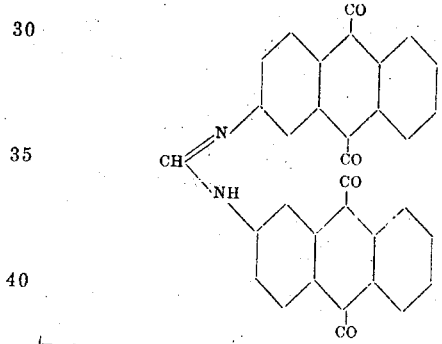

It is insoluble in dilute acids and alkalis and very difficultly soluble in most organic solvents, even on boiling. It dissolves in concentrated sulfuric acid, the solution being yellowish red, in which color the addition of boric acid makes no change. From an orange-red vat it dyes cotton orange-yellow shades of excellent fastness against the action of light, chlorin, and soap.

If the intermediate product be condensed with 1-methylamino-6-amino-anthraquinone, a mixed amidin is obtained which dyes shades of yellow which are redder. Other suitable amino-anthraquinone compound may be employed in a similar manner.

Example 4. In order to obtain the amidin derivative directly, allow a solution of 0.23 of a part of ortho-formic-acid-ethylester in 0.5 part of nitrobenzene to flow, drop by drop, into a boiling mixture of 1 part of 2-amino-anthraquinone and 2 parts of nitrobenzene. When the condensation product has finished separating out, cool the melt to about 100° C. and filter off the product and purify it by re-crystallization from nitrobenzene. In this example, the 2-amino-anthraquinone can be replaced by a derivative thereof, such for instance as 2-amino-3-methyl-anthraquinone and 2-amino-6-methyl-amino-anthraquinone.

Example 5: Grind together 6.5 parts of benzoyl-2-amino-anthraquinone and 4.2 parts of phosphorus pentachlorid and carefully heat the mixture until a clear liquid is obtained and the evolution of hydrochloric acid has ceased. When the mixture is cold, add ligroin, filter off the imid-chlorid which is produced and which possesses a constitution corresponding to the formula $A—N=CCl—C_6H_5$, and wash it several times with ligroin in order to free it from phosphorus oxy-chlorid. Then mix the crude imid-chlorid thus obtained with 4.4 parts of 2-amino-anthraquinone and 30 parts of nitrobenzene, and boil the whole for about 10 minutes, whereby at first hydrochloric acid is evolved. Then allow the melt to cool and, by the addition of alcohol, precipitate the beta-beta-dianthraquinonyl-benzamidin, and filter it off and re-crystallize it from ortho-dichlor-benzene, whereby glittering yellow needles are obtained. These are insoluble in dilute acids and alkalis and very difficultly soluble in the usual organic solvents. They yield an orange-yellow solution in concentrated sulfuric acid and give rise, with alkaline hydrosulfite, to an orange-red vat which dyes cotton and wool lemon yellow shades.

Example 6: Boil together, for a few hours, while stirring, at from 150° to 160° C., 10 parts of 2-amino-anthraquinone, 50 parts of nitrobenzene and 4.7 parts of benzo-trichlorid. When the reaction mixture has cooled down to about 40° C., filter off the product and wash it with alcohol, and re-crystallize it from nitrobenzene or ortho-dichlor-benzene. The amidin thus obtained melts at from 334° to 337° C., and analysis points to its possessing a constitution corresponding to the formula

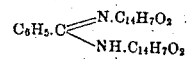

It is identical with the product of example 5 and dyes cotton, from an alkaline hydrosulfite vat, intense lemon yellow.

Now what we claim is:—

1. As new articles of manufacture amidins containing at least two 2-amino-anthraquinone residues and yielding yellow to red solutions in concentrated sulfuric acid, from yellow to red vats with alkaline hydrosulfite and dyeing cotton, from such a vat, yellow to orange-yellow shades.

2. As a new article of manufacture the amidin containing two 2-amino-anthraquinone residues which can be obtained by condensing 2-amino-anthraquinone with benzotrichlorid in the presence of nitrobenzene, which probably possesses a constitution corresponding to the formula

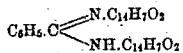

and which melts at about from 334° to 337° C., yields an orange-yellow solution in concentrated sulfuric acid, an orange-red vat in alkaline hydrosulfite and dyes cotton, from a vat, yellow shades.

In testimony whereof we have hereunto set our hands in the presence of two subscribing witnesses.

CARL MÜLLER.
MAX HENRY ISLER.

Witnesses:
JOSEPH PFEIFFER,
ERNEST G. EHRHARDT.